United States Patent [19]
Lyu

[11] Patent Number: 5,831,706
[45] Date of Patent: Nov. 3, 1998

[54] LIQUID CRYSTAL DISPLAYS WITH WIDENED VIEWING ANGLE AND METHODS OF FABRICATION THEREOF

[75] Inventor: Jae-jin Lyu, Kyungki-do, Rep. of Korea

[73] Assignee: Samsung Electronics Co., Ltd., Suwon, Rep. of Korea

[21] Appl. No.: 846,737

[22] Filed: Apr. 30, 1997

[30] Foreign Application Priority Data

May 14, 1996 [KR] Rep. of Korea ................... 1996-15914

[51] Int. Cl.[6] ........................ G02F 1/1337; G02F 1/1343
[52] U.S. Cl. ............................................. 349/129; 349/144
[58] Field of Search .................................. 349/128, 129, 349/144

[56] References Cited

U.S. PATENT DOCUMENTS

| | | | |
|---|---|---|---|
| 5,477,360 | 12/1995 | Sunohara et al. | 459/78 |
| 5,478,682 | 12/1995 | Nishikawa et al. | 430/20 |
| 5,479,282 | 12/1995 | Toko et al. | 359/75 |
| 5,576,863 | 11/1996 | Aoki et al. | 359/76 |
| 5,579,140 | 11/1996 | Yamahara et al. | 359/75 |
| 5,579,141 | 11/1996 | Suzuki et al. | 359/75 |
| 5,596,435 | 1/1997 | Sunohara et al. | 349/132 |
| 5,633,740 | 5/1997 | Asaoka et al. | 349/129 |
| 5,671,033 | 9/1997 | Katgiri et al. | 349/128 |

OTHER PUBLICATIONS

Kaneko et al., "Invited Address: Wide–Viewing–Angle Improvements for AMLCDs", SID 93 Digest, May 1993, pp. 265–268.

Takatori et al., "A Complementary TN LCD With Wide–Viewing–Angle Grayscale", Japan Display '92, pp. 591–594.

Koike et al., "Late–News Paper: A Full–Color TFT–LCD With a Domain–Divided Twisted–Nematic Structure", SID 92 Digest, May 1992, pp. 798–801.

Yang, "Two Domain Twisted Nematic and Tilted Homeotropic Liquid Crystal Displays for Active Matrix Applications", Conference Record of the 1991 International Display Research Conference, Oct. 1991, pp. 68–72.

Primary Examiner—William L. Sikes
Assistant Examiner—Tiep H. Nguyen
Attorney, Agent, or Firm—Myers Bigel Sibley & Sajovec

[57] ABSTRACT

A liquid crystal display (LCD) panel includes a substrate and an alignment layer, e.g., a polyimide polymer layer on the substrate. The alignment layer has a plurality of pixel areas defined thereon, a respective one which includes at least four domains, a respective one of which has a pretilt angle associated therewith and grooves formed therein along a groove direction such that a respective domain of a respective pixel area has a unique combination of pretilt angle and groove direction with respect to other domains of the pixel area. A respective domain of a respective one of the pixel areas may have one of a first pretilt angle or a second pretilt angle associated therewith, and may have grooves formed therein along one of a first direction or a second direction, the first and second directions being perpendicular. An LCD includes first and second panels having alignment layers arranged in an opposed relationship, with a liquid crystal material disposed therebetween. The first and second panels may be arranged such that a first pixel area of the first panel opposes a second pixel area of the LCD second panel, with a domain of the first pixel area opposing a domain of the second pixel area. The opposed domains may have the first and second pretilt angles associated therewith, respectively, and grooves formed therein along the first and second directions, respectively. The opposed first and second pixel areas produce a set of at least four different viewing directions. Related fabrication methods are also discussed.

26 Claims, 3 Drawing Sheets

LIQUID CRYSTAL DISPLAYS WITH WIDENED VIEWING ANGLE AND METHODS OF FABRICATION THEREOF

FIELD OF THE INVENTION

The present invention relates to displays, more particularly, to liquid crystal displays (LCDs) and methods of fabrication thereof.

BACKGROUND OF THE INVENTION

A liquid crystal display (LCD) typically includes a pair of panels between which a liquid crystal material, typically a twisted nematic (TN) liquid crystal material, is infused. The intensity of the LCD may be varied by varying the voltage applied across the liquid crystal material, thus controlling the light transmitted through the liquid crystal material.

The molecules of the liquid crystal material are typically long and generally have a spiral shape with a constant pitch when little or no voltage is applied across the molecule. Accordingly, light incident on a liquid crystal material typically passes through the material depending on the angle of incidence of the light with respect to the axes of the spiral molecules of the material. Thus, the viewing angle produced by an LCD tends to be dependent upon the alignment of these molecules with respect to the plane of the display.

Several techniques have been developed to align liquid crystal material in an LCD. A commonly-used technique involves coating a substrate with a thermal polymer, typically a polyimide polymer coating applied using a spin coating or offset printing technique, and then rubbing the polymer coating in a fixed direction to form grooves along that direction to form an aligning surface. Two of these alignment-layer coated substrates may be used to confine a liquid crystal material, with transparent electrodes and polarization plates typically being added thereto to provide means for applying a voltage across the liquid crystal material and for filtering light passing through the liquid crystal, respectively.

One approach to aligning liquid crystal molecules is to form so-called complementary twisted nematic (C-TN) cells, in which a first alignment layer having a low pretilt angle is opposed by a second alignment layer having a high pretilt angle, with two regions being defined on each of respective opposing cell portions which are rubbed in perpendicular directions to improve the viewing angle of the cell so defined. Two-domain twisted nematic (TDTN) cells and domain divided twisted nematic (DDTN) cells have also been proposed to provide viewing angle improvement. Structures of C-TN, TDTN and DDTN cells are described in "Wide-Viewing-Angle Improvements for AMLCDs," by S. Kaneko et al, *SID International Symposium Digest of Technical Papers*, p. 265–268.

Unfortunately, these techniques may not produce desired viewing properties for the LCD. For example, these techniques may yield improvement in the viewing angle along one of the vertical or horizontal axes of the display while leaving the viewing angle along the other axis undesirably restricted. Moreover, these techniques may involve complex and costly fabrication processes involving a large number of masking and rubbing steps. These fabrication processes may damage regions of the alignment layer, which can lead to poor alignment of the liquid crystal molecules.

SUMMARY OF THE INVENTION

In light of the foregoing, it is an object of the present invention to provide liquid crystal displays (LCDs), LCD panels and methods of fabrication therefor which can produce improved viewing angle characteristics.

It is another object of the present invention to provide LCDs, LCD panels, and methods of fabrication thereof which are less complex in design and utilize less complex fabrication processes.

These and other objects, features and advantages are provided according to the present invention by LCDs, LCD panels and methods of fabrication therefor in which a panel is formed including an alignment layer having a plurality of pixel areas defined thereon, a respective one of which includes at least four domains, a respective one of which has a pretilt angle associated therewith and grooves formed therein such that a respective domain of a respective pixel area has a unique combination of pretilt angle and groove direction with respect to other domains of the pixel area. Preferably, a respective domain of a respective pixel area has one of a first or a second pretilt angle and has grooves formed therein along one of a first or a second direction, the first and second directions being perpendicular. When such a panel is joined with a second similar panel in an opposed relationship, an LCD may be produced such that a respective pair of opposed pixel areas on the opposed panels produces a set of at least four different viewing directions. An LCD panel may be fabricated by forming an alignment layer on a substrate and irradiating selected portions of the alignment layer to produce areas having different pretilt angles, which then may be rubbed along first and second perpendicular directions to produce the different domains. In this manner, pixel areas with multiple domains can be formed using a single alignment layer and a relatively low number of masking and rubbing operations compared to conventional fabrication techniques.

In particular, according to the present invention, a liquid crystal display (LCD) panel includes a substrate and an alignment layer, e.g., a polyimide polymer layer, on the substrate. The alignment layer has a plurality of pixel areas defined thereon, a respective one of the pixel areas including at least four domains, a respective one of which has a pretilt angle associated therewith and grooves formed therein along a groove direction such that a respective domain of a respective pixel area has a unique combination of pretilt angle and groove direction with respect to other domains of the pixel area. A respective domain of a respective one of the pixel areas may have one of a first pretilt angle or a second pretilt angle associated therewith, and may have grooves formed therein along one of a first direction or a second direction, the first and second directions being perpendicular. A respective one of the pixel areas may include a pair of adjoining domains having grooves formed therein along a common direction and having different pretilt angles associated therewith.

In one embodiment according to the present invention, a respective one of the pixel areas includes a first domain having the first pretilt angle associated therewith and having a plurality of grooves formed therein along the first direction. A second domain adjoins the first domain, the second domain having the first pretilt angle associated therewith and having grooves formed therein along the second direction. A third domain adjoins the second domain, the third domain having the second pretilt angle associated therewith and having grooves formed therein along the second direction. A fourth domain adjoining the third domain and the first domain, the fourth domain having the second pretilt angle associated therewith and having grooves formed therein along the first direction.

An LCD according to the present invention includes first and second panels having alignment layers as described above, arranged in an opposed relationship. A liquid crystal material is disposed between the first and second panels, contacting the alignment layers of the first and second panels. The first and second panels may be arranged such that a first pixel area of the first panel opposes a second pixel area of the LCD second panel. The first and second panels may also be arranged such that a domain of the first pixel area opposes a domain of the second pixel area, and the opposed domains of the first and second pixel areas may have the first and second pretilt angles associated therewith, respectively, and have grooves formed therein along the first and second directions, respectively. The first and second panels may be arranged such that the opposed first and second pixel areas produce a set of at least four different viewing directions, which may include a first viewing direction, a second viewing direction opposite the first viewing direction, a third viewing direction perpendicular to the first and second viewing directions, and a fourth viewing direction opposite the third viewing direction, perpendicular to the first and second viewing directions.

According to method aspects, an LCD panel may be fabricated by forming a layer on a substrate and selectively irradiating a pixel area of the layer to define adjacent first and second areas therein, the first and second areas having respective first and second pretilt angles associated therewith. Grooves are formed in the pixel area along at least two directions to define at least four domains in the pixel area, a respective one of the domains of the pixel area having a combination of pretilt angle and groove direction which is unique with respect to the other domains of the pixel area. The domains may be defined by forming grooves in the pixel area along a first direction and then forming grooves in selected portions of the pixel area along a second direction to define a first domain having the first pretilt angle and grooves therein along the first direction, a second domain having the second pretilt angle and the grooves formed along the first direction, a third domain having the first pretilt angle and grooves therein along the second direction, and a fourth domain having the second pretilt angle and grooves therein along the second direction.

Irradiation of the layer may be preceded by treating the layer to produce the first pretilt angle and masking the layer to cover the first area of the pixel area and to expose the second area of the pixel area. The layer may then be selectively irradiated by irradiating the exposed second area of the pixel area to produce the second pretilt angle associated therewith. The layer may be a polyimide polymer layer, and the step of irradiating may include irradiating the exposed second area with ultraviolet radiation, preferably with ultraviolet radiation having a wavelength between 260 nanometers and 280 nanometers.

The step of forming grooves along the second direction may include masking the layer to cover a third area of the pixel area and to expose an adjacent fourth area of the pixel area, the third and fourth areas overlapping the first and second areas in a transverse direction. Grooves may then be formed in the exposed fourth area along the second direction. The second direction preferably is transverse to the first direction.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
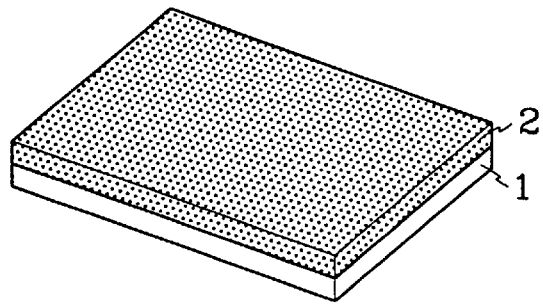
FIGS. 1A–1G are perspective views of intermediate fabrication products illustrating operations for forming an LCD panel according to the present invention.
Figure 1B:
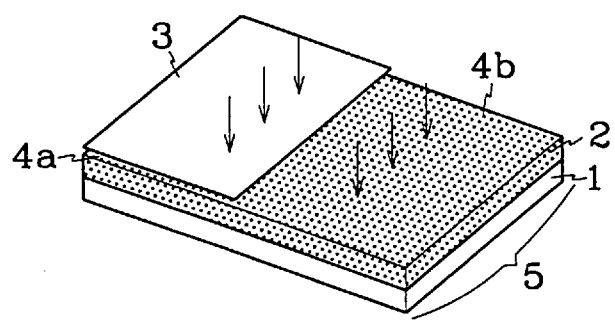
Figure 1C:
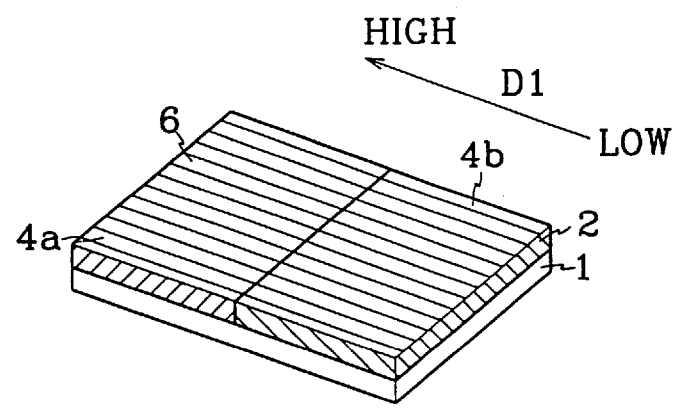
Figure 1D:
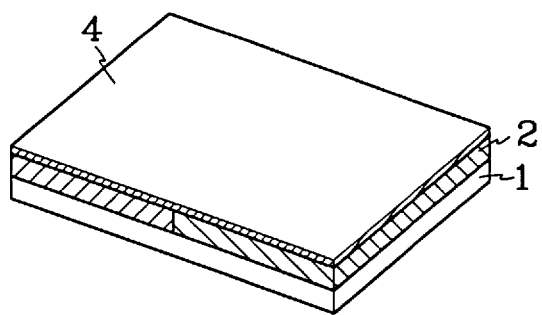
Figure 1E:
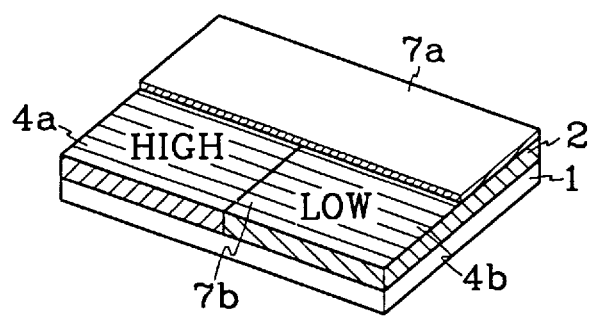
Figure 1F:
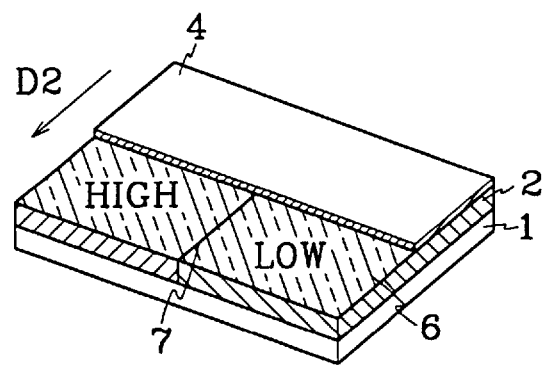
Figure 1G:
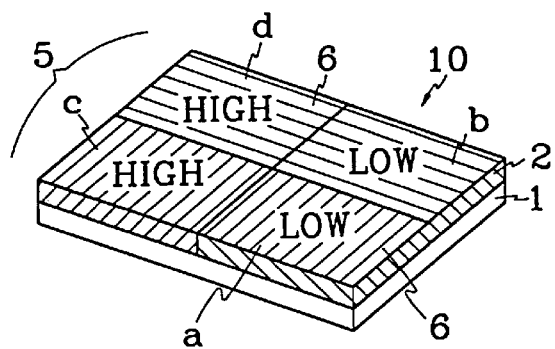

Referring to FIG. 1G, a liquid crystal display (LCD) panel 10 includes a substrate 1 and an alignment layer 2 formed thereon. A pixel area 5 of the alignment layer 2 includes four domains a–d. A respective one of the domains a-d has one of a first or second pretilt angle HIGH, LOW associated therewith, and has grooves 6 formed therein along one of a first or second direction D1, D2, such that a respective domain of the pixel area 5 has a unique combination of pretilt angle and groove direction.

Figure 2A:
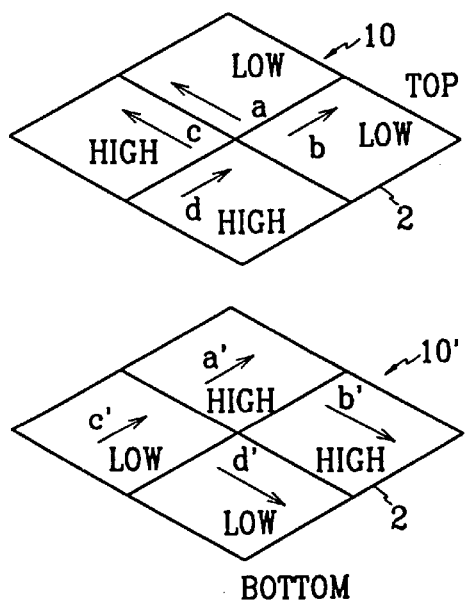
FIG. 2A is perspective view illustrating opposed pixel areas of opposed LCD panels according to the present invention.
Figure 2B:
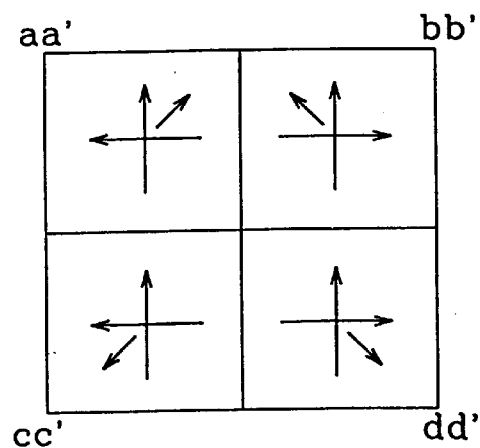
FIG. 2B is a plan view illustrating viewing angle directions for an LCD according to the present invention.

To form a display, two LCD panels 10, 10' may be arranged in an opposed relationship such that pixel areas 5, 5' of the panels 10, 10' are opposed, as illustrated in FIG. 2A. The panels 10, 10' of the illustrated embodiment are arranged such that opposing domains a/a', b/b', c/c', d/d' having different pretilt angles and perpendicular groove directions to thereby align liquid crystal molecules disposed between and contacting the alignment layers of the panels 10, 10' in four different alignments. As illustrated in FIG. 2B, the opposed pixel areas 5, 5' thus produces four different viewing angles, e.g., 45°, 135°, 225° and 315°, a respective one of viewing angles being produced by a respective one of the pairs of opposing domains a/a', b/b', c/c', d/d'. To an observer viewing the LCD, the different viewing angles can combine to provide a wide-viewing angle display without gray scale inversion.

Operations for fabricating an LCD panel according to the present invention are illustrated in FIGS. 1A–1G. Those skilled in the art will appreciate that these figures, which illustrate a pixel area of an LCD panel, may be generalized to formation of an LCD panel including several such pixel areas. Those skilled in the art will appreciate that various patterns of pixel areas may be used with the present invention.

Referring to FIG. 1A, a layer 2, e.g., a polyimide layer, is formed on a substrate 1 such as a glass plate. The layer 2 preferably is pretreated such that it has a relatively high pretilt angle associated therewith, e.g., a pretilt angle of 5° to 7°. As illustrated in FIG. 1B, a photomask 3 is then formed on the layer 2 which covers a first elongate rectangular area 4a of the pixel area 5, while leaving a second elongate rectangular area 4b exposed. The exposed area 4a is irradiated, preferably using ultraviolet radiation with wavelength in the range of 260 nanometers to 280 nanometers, to produce a lower pretilt angle LOW, e.g., a pretilt angle of 0.5° to 2° in the exposed second area 4b while the covered first area 4a of the layer 2 retains the higher pretilt angle HIGH. As illustrated in FIG. 1C, the photomask 3 is then removed and the layer 2 is rubbed in a first direction D1 to produce a plurality of grooves 6 along the first direction D1 transverse to the first and second elongate rectangular areas 4a, 4b.

As illustrated in FIGS. 1D and 1E, a second photomask 4 is formed on the layer 2 which selectively covers a third elongate rectangular area 7a of the pixel area 5 while leaving a fourth elongate rectangular area 7b exposed. As illustrated, the third and fourth areas 7a, 7b lie transverse to the first and second areas 4a, 4b of FIG. 1B. As illustrated in FIG. 1F, the exposed third area 7a is then rubbed in second direction D2 which preferably is perpendicular to the first direction D1, thus producing grooves in the layer 2 in the third area 7a. The second photomask 4a may then be removed to yield an alignment layer having a pixel area 5 with four domains a–d, a respective one of the domains a-d having one of the first or second pretilt angle HIGH, LOW associated therewith and a plurality of grooves 6 formed therein along one of the first or second direction D1, D2, as illustrated in FIG. 1G.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A liquid crystal display (LCD) panel, comprising:
a substrate; and
an alignment layer on said substrate, said alignment layer having a plurality of pixel areas defined thereon, a respective one of said pixel areas including four domains, a respective one of which has a pretilt angle for liquid crystal associated therewith and grooves formed therein along a groove direction such that the respective domain of the respective pixel area has a unique combination of pretilt angle for liquid crystal and groove direction with respect to other domains of the pixel area.

2. A panel according to claim 1, wherein the respective domain of the respective one of said pixel areas has one of a first pretilt angle or a second pretilt angle associated therewith, and wherein the respective domain of the respective one of said pixel areas has grooves formed therein along one of a first direction or a second direction.

3. A panel according to claim 2, wherein the respective one of said pixel areas comprises a pair of adjoining domains from said four domains having grooves formed therein along a common direction and having different pretilt angles associated therewith.

4. A panel according to claim 3, wherein the respective one of said pixel areas comprises:
a first one of the domains having said first pretilt angle associated therewith and having a plurality of grooves formed therein along said first direction;
a second one of the domains adjoining said first domain, said second domain having said first pretilt angle associated therewith and having grooves formed therein along said second direction;
a third one of the domains adjoining said second domain, said third domain having said second pretilt angle associated therewith and having grooves formed therein along said second direction; and
a fourth one of the domains adjoining said third domain and said first domain, said fourth domain having said second pretilt angle associated therewith and having grooves formed therein along said first direction.

5. A panel according to claim 1, wherein said alignment layer comprises a polyimide polymer.

6. A liquid crystal display (LCD), comprising:
first and second panels arranged in an opposed relationship, a respective one of said first and second panels comprising:
a substrate;
an alignment layer on said substrate, said alignment layer having a plurality of pixel areas defined thereon opposite said substrate, a respective one of said pixel areas including four domains, a respective one of which has a pretilt angle for liquid crystal associated therewith and grooves formed therein along a respective groove direction, the respective domain of the respective pixel area having a unique combination of pretilt angle for liquid crystal and groove direction with respect to other domains of the pixel area;
and
a liquid crystal material disposed between said first and second panels, contacting said alignment layers.

7. An LCD according to claim 6, wherein the respective domain of the respective one of said pixel areas has one of a first pretilt angle or a second pretilt angle associated therewith, and wherein the respective domain of the respective one of said pixel areas has grooves are formed therein along one of a first direction or a second direction.

8. An LCD according to claim 7, wherein the respective one of said pixel areas comprises a pair of adjoining domains from said four domains having grooves formed therein along a common direction and different pretilt angles associated therewith.

9. An LCD according to claim 8, wherein the respective one of said pixel areas comprises:
a first one of the domains having said first pretilt angle associated therewith and having grooves formed therein along said first direction;
a second one of the domains adjoining said first domain, said second domain having said first pretilt angle associated therewith and having grooves formed therein along said second direction;
a third one of the domains adjoining said second domain, said third domain having said second pretilt angle associated therewith and having grooves formed therein along said second direction; and
a fourth one of the domains adjoining said third domain and said first domain, said fourth domain having said second pretilt angle associated therewith and having grooves formed therein along said first direction.

10. An LCD according to claim 6, wherein said first and second panels are arranged such that a first one of the pixel areas of said first panel opposes a second one of the pixel areas of said LCD second panel.

11. An LCD according to claim 10, wherein said first and second panels are arranged such that one of the domains of said first pixel area opposes one of the domains of said second pixel area, and wherein said opposed domains of said first and second pixel areas have said first and second pretilt angles associated therewith, respectively, and have grooves formed therein along said first and second directions, respectively.

12. An LCD according to claim 10, wherein said first and second panels are arranged such that said opposed first and second pixel areas produce a set of at least four different viewing directions.

13. An LCD according to claim 12, wherein said set of at least four different viewing directions comprises:
a first viewing direction;
a second viewing direction opposite said first viewing direction;
a third viewing direction perpendicular to said first and second viewing directions; and
a fourth viewing direction opposite said third viewing direction, perpendicular to said first and second viewing directions.

14. A method of fabricating a liquid crystal display (LCD) panel, the method comprising the step of:

forming an alignment layer on a substrate, the alignment layer having a plurality of pixel areas defined thereon, a respective one of the pixel areas including four domains, a respective one of which has a pretilt angle associated therewith and grooves formed therein along a respective groove direction such that a respective one of the domains of the respective pixel area has a unique combination of pretilt angle and groove direction with respect to other domains of the pixel area.

15. A method according to claim 14, wherein said step of forming an alignment layer on a substrate comprises the steps of:

forming a layer on the substrate; and forming a plurality of pixel areas in the layer, a respective one of said pixel areas having at least four domains therein, a respective one of which has one of a first pretilt angle or a second pretilt angle associated therewith, a respective one of the domains of a respective one of said pixel areas has grooves therein along one of a first direction or a second direction, said first and second directions being perpendicular.

16. A method according to claim 15, wherein said step of forming the plurality of pixel areas comprises the step of forming a pair of adjoining domains from said four domains having grooves therein along a common direction and having different pretilt angles associated therewith.

17. A method according to claim 15, wherein said step of forming the plurality of pixel areas comprises the step of:

forming each of the pixel areas including a first one of the domains having said first pretilt angle associated therewith and having a plurality of grooves therein along said first direction, a second one of the domains adjoining said first domain having said first pretilt angle associated therewith and having grooves therein along said second direction, a third one of the domains adjoining said second domain having said second pretilt angle associated therewith and having grooves therein along said second direction, and a fourth one of the domains adjoining said first and third domains having said second pretilt angle associated therewith and having grooves formed therein along said first groove direction.

18. A method according to claim 15, wherein said step of forming the layer on the substrate comprises the step of forming a polyimide polymer layer.

19. A method of forming a liquid crystal display (LCD) panel, the method comprising the steps of:

forming a layer on a substrate;

selectively irradiating a pixel area of the layer to define adjacent first and second areas therein, the first area of the pixel area having a first pretilt angle associated therewith, the second area of the pixel area having a second pretilt angle associated therewith;

forming grooves in the pixel area along at least two directions to define four domains in the pixel area, a respective one of the domains of the pixel area having a unique combination of pretilt angle and groove direction with respect to the other domains of the pixel area.

20. A method according to claim 19, wherein said step of forming grooves comprises the steps of:

forming grooves in the pixel area along a first direction; and forming grooves in selected portions of the pixel area along a second direction to define a first one of the domains having the first pretilt angle associated therewith and grooves therein along the first direction, a second one of the domains having the second pretilt angle associated therewith and grooves formed along the first direction, a third one of the domains having the first pretilt angle associated therewith and grooves therein along the second direction, and a fourth one of the domains having the second pretilt angle associated therewith and grooves therein along the second direction.

21. A method according to claim 20, wherein the first direction is transverse to the first and second areas.

22. A method according to claim 20, wherein said step of forming grooves in selected portions of the pixel area comprises the steps of:

masking the layer to cover a third area of the pixel area and to expose an adjacent fourth area of the pixel area, the third and fourth areas overlapping the first and second areas of the pixel area in a transverse direction; and forming grooves in the exposed fourth area of the pixel area along the second direction.

23. A method according to claim 22, wherein the second direction is transverse to the first direction.

24. A method according to claim 19:

wherein said step of irradiating is preceded by the steps of:

treating the layer to produce said first pretilt angle; and masking the layer to cover the first area of the pixel area and to expose the second area of the pixel area; and wherein said step of irradiating comprises the step of irradiating the exposed second area to produce the second pretilt angle associated therewith.

25. A method according to claim 24, wherein said step of forming a layer comprises the step of forming a polyimide polymer layer, and wherein said step of irradiating the exposed second area of the layer comprises the step of irradiating the exposed second area with ultraviolet radiation.

26. A method according to claim 25, wherein said step of irradiating the exposed second area comprises the step of irradiating the exposed second area with ultraviolet radiation having a wavelength between 260 nanometers and 280 nanometers.

* * * * *